(12) United States Patent
McKay

(10) Patent No.: US 11,253,415 B2
(45) Date of Patent: Feb. 22, 2022

(54) BODY LIGHTENING SYSTEM FOR GAIT TRAINING

(71) Applicant: ASSOCIATION DE LA SCLÉROSE EN PLAQUES DE L'ESTRIE INC., Sherbrooke (CA)

(72) Inventor: René McKay, Melbourne (CA)

(73) Assignee: ASSOCIATION DE LA SCLÉROSE EN PLAQUES DE L'ESTRIE

( * ) Notice: Subject to any disclaimer, the term of this patent is extended or adjusted under 35 U.S.C. 154(b) by 554 days.

(21) Appl. No.: 16/205,345

(22) Filed: Nov. 30, 2018

(65) Prior Publication Data
US 2019/0167507 A1 Jun. 6, 2019

Related U.S. Application Data

(60) Provisional application No. 62/594,852, filed on Dec. 5, 2017.

(51) Int. Cl.
*A61H 3/00* (2006.01)
*A61H 1/00* (2006.01)
(Continued)

(52) U.S. Cl.
CPC ............... *A61H 3/008* (2013.01); *A61H 1/00* (2013.01); *A61H 1/0229* (2013.01);
(Continued)

(58) Field of Classification Search
CPC ............ A63B 21/4001; A63B 21/4007; A63B 69/0064; A63B 71/0009; A63B 21/00181; A63B 23/04; A63B 21/045; A63B 7/00; A61H 3/00; A61H 3/008; A61H 1/00; A61H 1/0229; A61H 2003/006; A61H 2003/007; A61H 2003/043; A61H 2201/0161; A61H 2201/0173; A61H 2201/0192; A61H 2201/1207; A61H 2201/1418; A61H 2201/1635; A61H 2201/1652; A61H 2201/5007; A61H 2201/5023; A61H 2201/5046; A61H 2201/5058; A61H 2201/5097;
(Continued)

(56) References Cited

U.S. PATENT DOCUMENTS 3,330,052 A * 7/1967 Johnson .................... B64G 7/00
434/255
3,780,663 A * 12/1973 Pettit ..................... A61G 7/1051
104/307
(Continued)

*Primary Examiner* — Tu A Vo
(74) *Attorney, Agent, or Firm* — Lavery, De Billy, LLP; Gonzalo Lavin

(57) ABSTRACT

A body lightening system for at least partially supporting the weight of a user, the system including a structure having a frame and a motion system, the motion system driving the structure to follow the movements of the user, a holding system, the holding system including a holding mechanism, a hanger and a plurality of hanging cables, the plurality of hanging cables connecting the hanger to a harness to be worn by the user, a power system including a power source for powering the body lightening system, and a human machine interface, the human machine interface providing control over the motion of the motion system and the percentage of the user's weight supported by the holding system.

9 Claims, 12 Drawing Sheets

(51) Int. Cl.
*A61H 1/02* (2006.01)
*G06F 3/041* (2006.01)
*A61H 3/04* (2006.01)

(52) U.S. Cl.
CPC .. *A61H 2003/006* (2013.01); *A61H 2003/007* (2013.01); *A61H 2003/043* (2013.01); *A61H 2201/0161* (2013.01); *A61H 2201/0173* (2013.01); *A61H 2201/0192* (2013.01); *A61H 2201/1207* (2013.01); *A61H 2201/1418* (2013.01); *A61H 2201/1635* (2013.01); *A61H 2201/1652* (2013.01); *A61H 2201/5007* (2013.01); *A61H 2201/5023* (2013.01); *A61H 2201/5046* (2013.01); *A61H 2201/5058* (2013.01); *A61H 2201/5097* (2013.01); *A61H 2203/0406* (2013.01); *A61H 2203/0487* (2013.01); *A61H 2230/00* (2013.01); *A61H 2230/805* (2013.01); *G06F 3/041* (2013.01)

(58) Field of Classification Search
CPC .... A61H 2203/0406; A61H 2203/0487; A61H 2230/00; A61H 2230/805; A61H 1/0218; G06F 3/041; A61G 7/1015
See application file for complete search history.

(56) References Cited

U.S. PATENT DOCUMENTS

| | | | | |
|---|---|---|---|---|
| 4,911,426 A * | 3/1990 | Scales | ............... | A61H 3/008 128/845 |
| 5,333,333 A * | 8/1994 | Mah | ............... | A61G 5/10 280/250.1 |
| 5,538,268 A * | 7/1996 | Miller | ............... | A61H 3/04 280/87.041 |
| 5,569,129 A * | 10/1996 | Seif-Naraghi | ....... | A61G 7/1019 135/67 |
| 5,603,677 A * | 2/1997 | Sollo | ............... | A61H 1/0229 135/67 |
| 5,662,560 A * | 9/1997 | Svendsen | ............... | A61H 3/04 482/54 |
| 6,139,475 A | 10/2000 | Bessler | ............... | A61H 3/008 482/66 |
| 6,302,828 B1* | 10/2001 | Martin | ............... | A61H 3/008 482/43 |
| 6,578,594 B1* | 6/2003 | Bowen | ............... | A61H 3/008 135/67 |
| 2001/0045227 A1* | 11/2001 | Balan | ............... | A61H 3/008 135/67 |
| 2002/0011714 A1* | 1/2002 | Kurashige | ............... | A61H 3/008 280/242.1 |
| 2007/0054784 A1* | 3/2007 | Wu | ............... | A47D 13/04 482/69 |
| 2011/0201978 A1* | 8/2011 | Jeon | ............... | A61G 5/128 601/35 |
| 2013/0116604 A1* | 5/2013 | Morilla | ............... | A61G 7/1015 601/33 |
| 2013/0180557 A1* | 7/2013 | Triolo | ............... | A61H 3/04 135/66 |
| 2014/0058299 A1* | 2/2014 | Sankai | ............... | A61H 3/00 601/35 |
| 2014/0201906 A1* | 7/2014 | Erturk | ............... | A61G 7/1001 5/81.1 R |
| 2014/0206503 A1* | 7/2014 | Stockmaster | ............... | A61H 3/008 482/4 |
| 2015/0115556 A1* | 4/2015 | Ledea | ............... | A61H 3/04 280/79.11 |
| 2015/0143627 A1* | 5/2015 | McBride | ............... | A61H 3/008 5/81.1 R |
| 2016/0367429 A1* | 12/2016 | Dolce | ............... | A61H 3/008 |
| 2017/0165145 A1* | 6/2017 | Aryananda | ............... | A61G 7/1015 |

\* cited by examiner

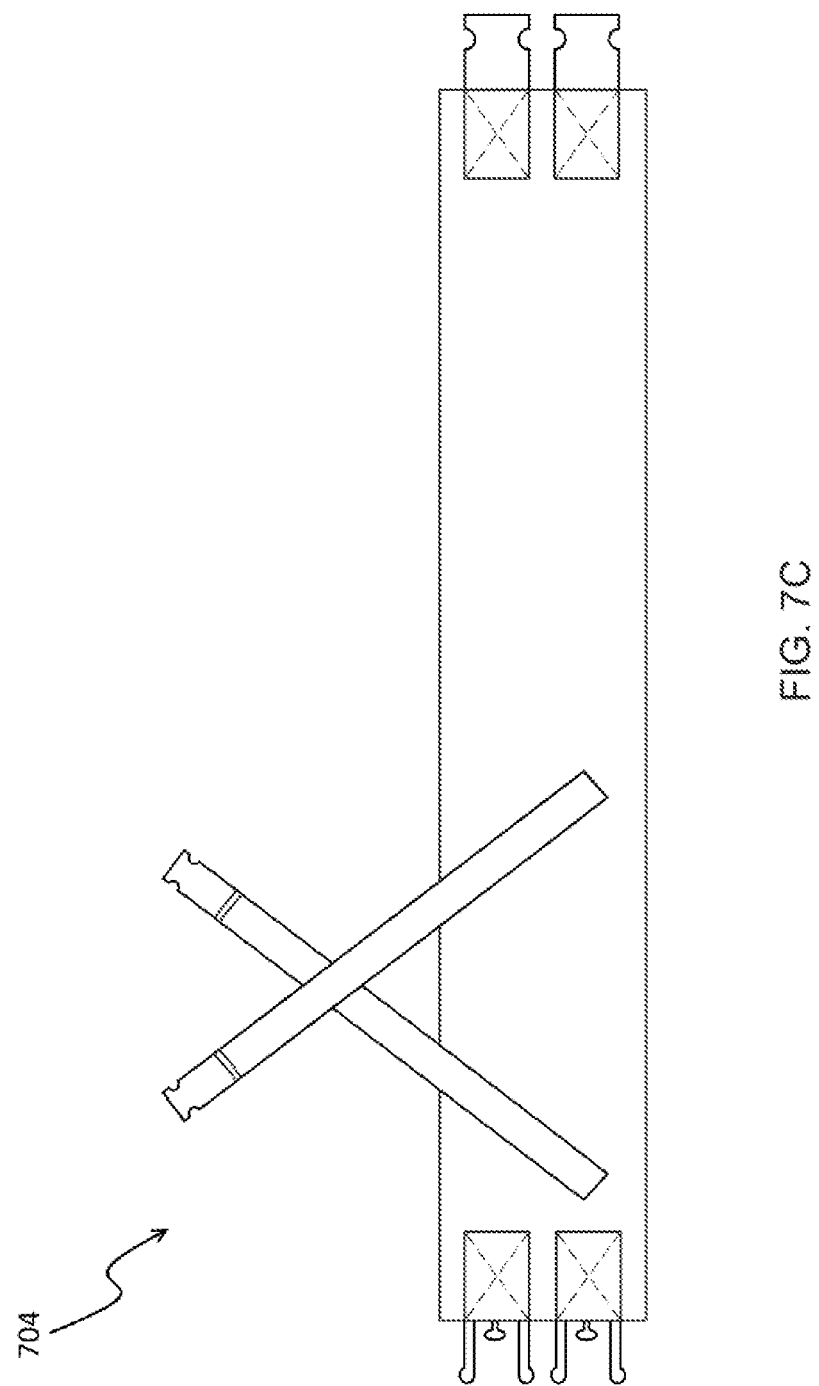

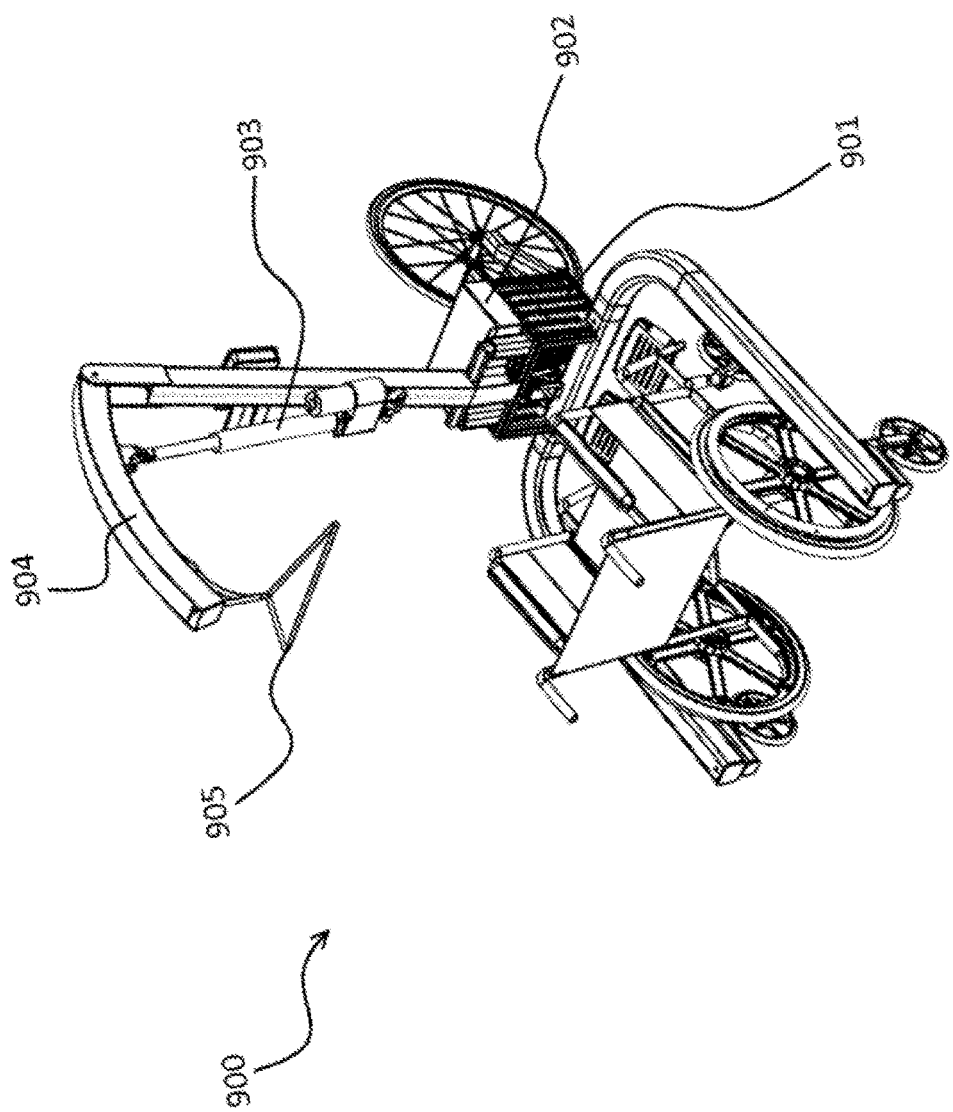

BODY LIGHTENING SYSTEM FOR GAIT TRAINING

CROSS REFERENCE TO RELATED APPLICATION

This application claims benefit, under 35 U.S.C. § 119(e), of U.S. provisional application Ser. No. 62/594,842, filed on Dec. 5, 2017, which is incorporated herein in its entirety by reference.

FIELD OF THE INVENTION

The present application relates to a transportable body lightening system for the user's walking training, assistance, or rehabilitation. The device provides weight support and enables the person to be at least partially supported from above for such uses as moving from a sitting to a standing position and for gait training, amongst others.

BACKGROUND OF THE INVENTION

It is well known to provide some partial weight bearing gait training to patients that have either completely lost or suffer from a reduced ability to walk. The idea consists of training a patient to walk while his or her weight is partially supported—whether by another person or by some mechanical device—and the amount of weight relief is gradually reduced as the patient improves his or her walking skills. A patient suffering the effects of illness or injury that curtail his or her ability to walk and support his or her full body weight can therefore improve their gait with the aid of such method. The ultimate goal is for the person to become physically capable of supporting his or her own weight while walking autonomously.

Mechanical gait training systems already exist and are available on the market, but most do not offer linear weight support. Instead, they control the patient's weight according to the extension of a holding cable. Consequently, the weight support varies as the patient moves or walks and the force exerted for the purposes of body lightening is neither constantly determined nor controlled.

Gait training systems currently available on the market use a variety of methods to support a portion of a patient's body weight. Most such structures employ a harness worn by the patient that is connected to overhead cables and/or elastic ropes that apply an upward physical force to partially support the patient's body weight. In some systems, the cables or elastic ropes are attached to an adjustable frame to increase the force as the frame moves upward through the use of a power-assisted hydraulically operated mast. In others, cables run over a series of pulleys which are attached to weights that counterbalance the patient's weight. Some systems are connected to a mechanism attached to a ceiling rail to mobilize the patient within a defined space. Springs are sometimes added to some mechanisms in order to allow small amounts of movement.

The prior art demonstrates small, transportable and rollable devices that support only up to a certain percentage of the patient's weight and that is not motorized. The prior art also demonstrates, in gait training apparatuses, the use of a movement detector to detect the movement of the user and a control unit adapted to run the drive unit in response to the user's movements such that the movable base follows the user according to a predetermined distance range and a predetermined angular range with respect to the user's direction of movement.

One of the shortcomings of such systems is that weight load variation occurs as the patient moves. As a result, the force deployed during training sessions is not linear, depending on the tension applied to the cables and/or ropes. Therefore, there is a need for a system that makes it possible to overcome these limitations and particularly to offer a large variation in controlling the weight supported by the structure. There is also a need for such a system to be motorized and transportable.

SUMMARY OF THE INVENTION

In order to address the above and other drawbacks, there is provided a body lightening system for at least partially supporting the weight of a user, the system comprising a structure, the structure comprising a frame and a motion system, the motion system driving the structure to follow the movements of the user, a holding system, the holding system comprising a holding mechanism, a hanger and a plurality of hanging cables, the plurality of hanging cables connecting the hanger to a harness to be worn by the user, a power system comprising a power source for powering the body lightening system, and a human machine interface, the human machine interface providing control over the motion of the motion system and the percentage of the user's weight supported by the holding system.

In an embodiment, the human machine interface is controllable by at least one of a touch screen and a remote control.

In an embodiment, the motion system further comprises a plurality of motorized wheels drivable by at least one motor, a plurality of ball wheels and a motor control subsystem controlling the at least one motor and connected to the human machine interface such that the motion of the structure is controllable via the human machine interface and is programmable to at least one of advance, reverse and rotate the structure.

In an embodiment, the structure is disassembleable and storable.

In an embodiment, the height of the frame is adjustable via a plurality of linear sliders.

In an embodiment, the height of the frame is adjustable to accommodate a plurality of user heights comprising a range between a seated female in the first percentile female height and a standing male in the ninety-ninth percentile male height.

In an embodiment, the adjustability of the height of the frame allows the holding system to lift the user from a seated position to a standing position.

In an embodiment, the holding mechanism comprises at least one cam and at least one spring connected by a shaft, the holding mechanism further comprising at least one holding cable connected to the at least one cam and the hanger for supporting the weight of the user.

In an embodiment, the system further comprises an activation system for selectively adjusting the number of the at least one spring exerting tension through the holding mechanism based on the desired supported weight of the user.

In an embodiment, the system further comprises at least one screw passing through the at least one cam, the at least one screw preventing the at least one cam from rotating beyond a predetermined limit.

In an embodiment, the plurality of hanging cables comprise a plurality of attachment points for attaching the harness to the holding system.

In an embodiment, the harness comprises an upper harness attachable to the upper body of the user, a harness belt attachable to the midsection of the user and a lower harness attachable to the lower body of the user.

In an embodiment, the harness belt and the lower harness are removable.

In an embodiment, the power source comprises at least one battery.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

FIGS. 7A to 7C are front views of the various sections of a harness for a body lightening system and FIG. 7D is a front and rear view of a patient wearing the harness, in accordance with an illustrative embodiment of the present invention;

FIG. 9 is a perspective view of a body lightening system according to an alternate embodiment of the present invention.

DESCRIPTION OF ILLUSTRATIVE EMBODIMENTS

The present invention is illustrated in further details by the following non-limiting examples.

Figure 1:
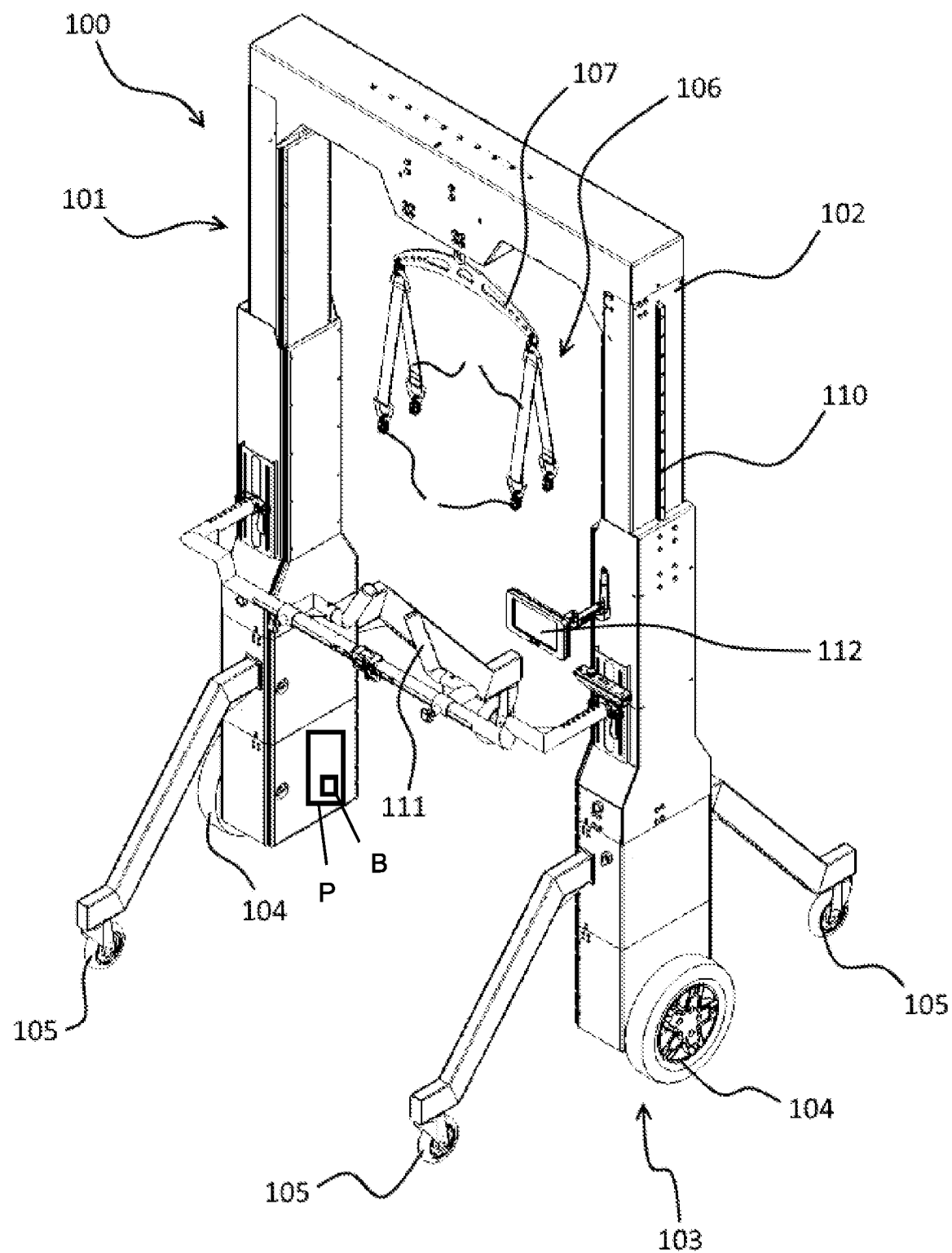
FIG. 1 is a perspective view of a body lightening system according to a preferred embodiment of the present invention.

Referring first to FIG. 1, there is shown a body lightening system, generally referred to by the reference numeral 100, in accordance with a preferred embodiment of the present invention. The body lightening system 100 comprises a mobile, rotatable and dismountable structure 101 that creates a body lightening effect perceived by a user with reduced or a lack of mobility. The structure 101 consists of a reversed "U" frame 102 to which is attached a motion system 103 allowing the structure 101 to follow the user. The motion system 103 illustratively comprises a pair of motorized wheels 104 for driving the structure 101 and four ball wheels 105. The lower parts of the structure 101 house at least one motor (not shown), a plurality of fixing plates (not shown) that structurally maintain the motorized wheels 104 in place and a power system (not shown) comprising a power source P such as a battery B. In an embodiment, the motion system 103 further comprises a motor control subsystem (not shown) allowing the user to control the system 100 and enable the motion system 103 to, for example, advance, reverse and rotate. The upper part of the structure 101 comprises a holding system 106 comprising a hanger 107 attached by hanging cables 108 to various anatomical points identified as attachment points 109 to a harness (not shown) attached to the user's body for better balance and better control of the center of gravity of the user and the action of lifting and deposing of the user's body. The lifting is done directly with the structure via a screw actuator (not shown) located on each side of the structure 101. The actuators are combined with a pair of linear sliders 110, one inside each side of the structure 101, enabling adjustment of the height of the structure 101. A pair of armrests 111 for the user are adjustable in height, depth and width to provide the user with an ergonomic grip. A human machine interface 112 enables dynamic interaction between the user and the system 100 and allows the user or a person assisting the user to control the motion of the structure 101 and the percentage of the user's weight supported by the system 100. In an embodiment, the human machine interface 112 is operable with a touch screen or with a remote control. In an embodiment, the motor control subsystem is controllable by the touch screen or the remote control. The power system is configured such that the power source is transportable and autonomous for a period of time for both indoor and outdoor training sessions.

Figure 2A:
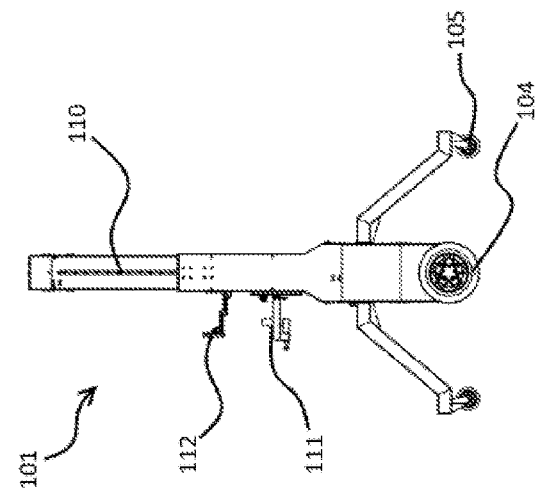
FIGS. 2A and 2B are respective front and side views of a body lightening system in an opened structure wherein the hanger is at its highest possible point and FIGS. 2C and 2D are respective front and side views of a body lightening system in a closed structure wherein the hanger is at its lowest possible point, according to an illustrative embodiment of the present invention.
Figure 2B:
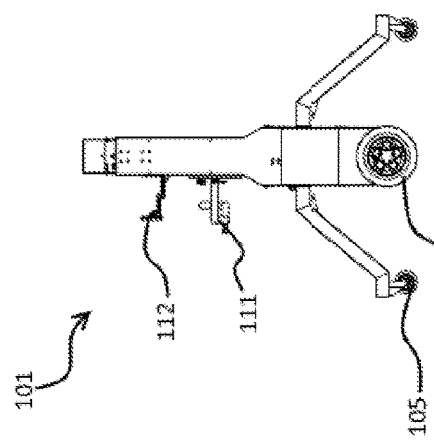
Figure 2C:
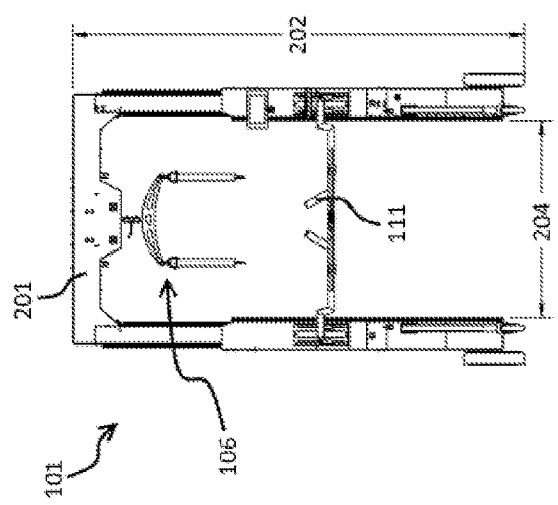
Figure 2D:
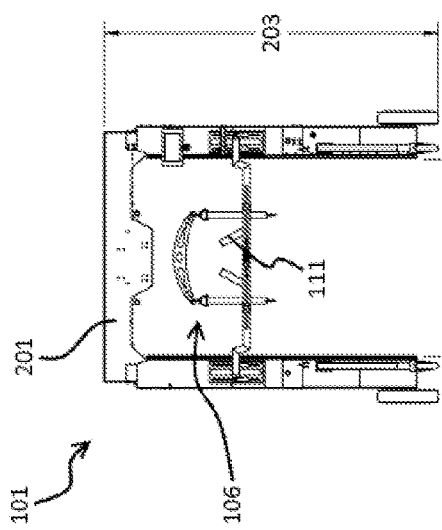

Referring now to FIGS. 2A-2D, the structure 101 is shown in its opened position (as shown in FIGS. 2A and 2B) and in its closed position (FIGS. 2C-2D)). In the opened position, the horizontal beam 201 of structure 101 and the holding system 106 are at their highest position 202, enabling the user to be in a full standing position. When at its highest position 202, the structure 101 is tall enough to allow a male user who is in the ninety-ninth (99th) height percentile to be fully standing. In the closed position, the horizontal beam 201 and holding system 106 are at their lowest position 203. In its lowest position 203, the structure 101 is short enough to allow a female user who is in the first (1st) weight percentile to be in a seated position. Further, linear sliders 110 inside the sides of structure 101 enable the adjustment of the height of the horizontal beam 201 and the holding system 106. In addition, the width of structure 101 is wide enough to accommodate a wheelchair within the two sides of structure 101.

Figure 3:
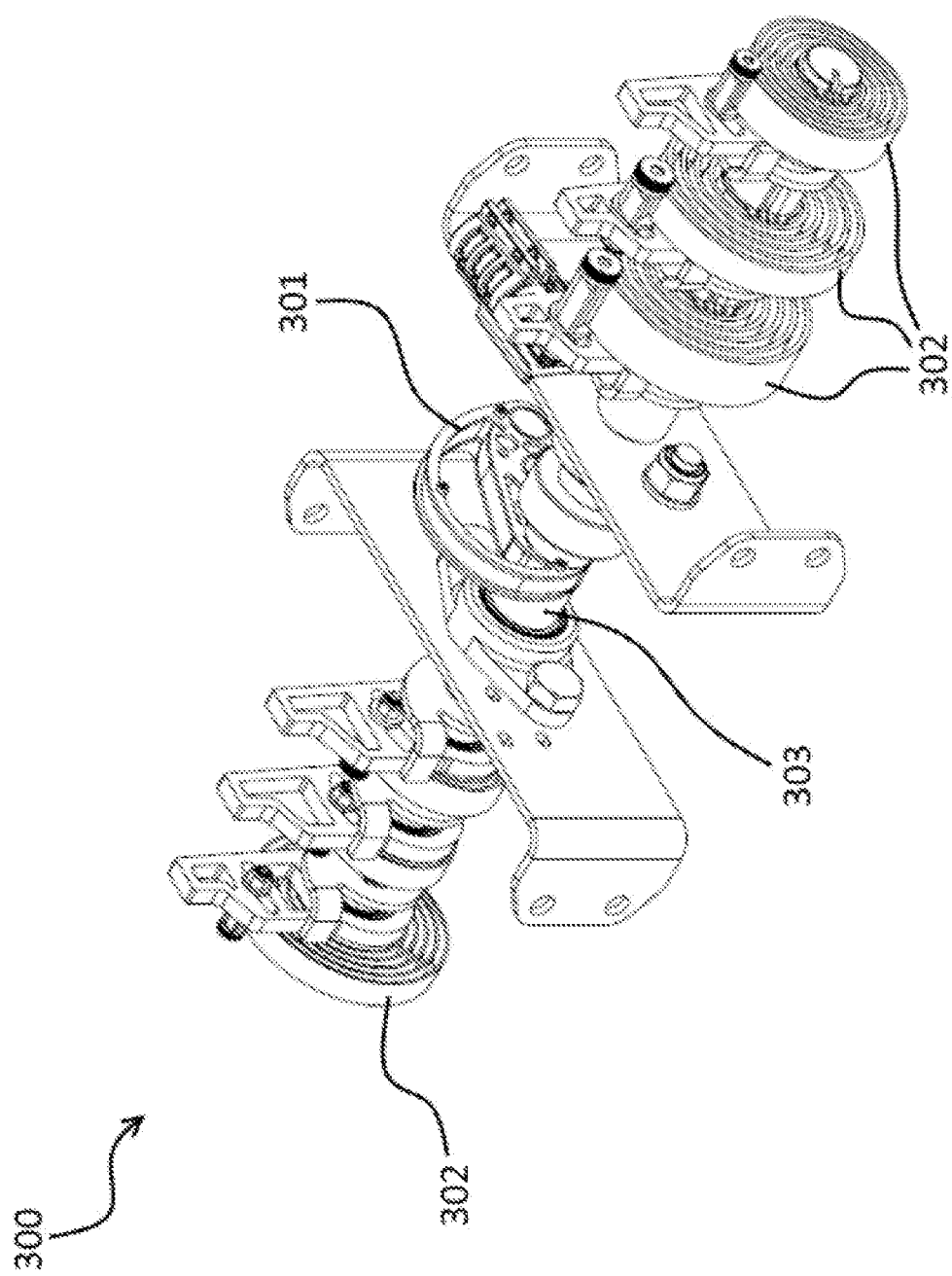
FIG. 3 is a perspective view of an assembled holding mechanism for a body lightening system, according to an illustrative embodiment of the present invention.

Referring now to FIG. 3, holding system 106 additionally comprises a holding mechanism 300, which comprises a at least one cam 301 and at least one spring 302, illustratively a coiled spring, aligned on a shaft 303, allowing for a constant and linear support of the user. By utilizing multiple springs 302, holding system 106 may be configured to support a wide range of human body weight percentages, as many possible combinations of engaged springs 302 may be chosen.

Figure 4B:
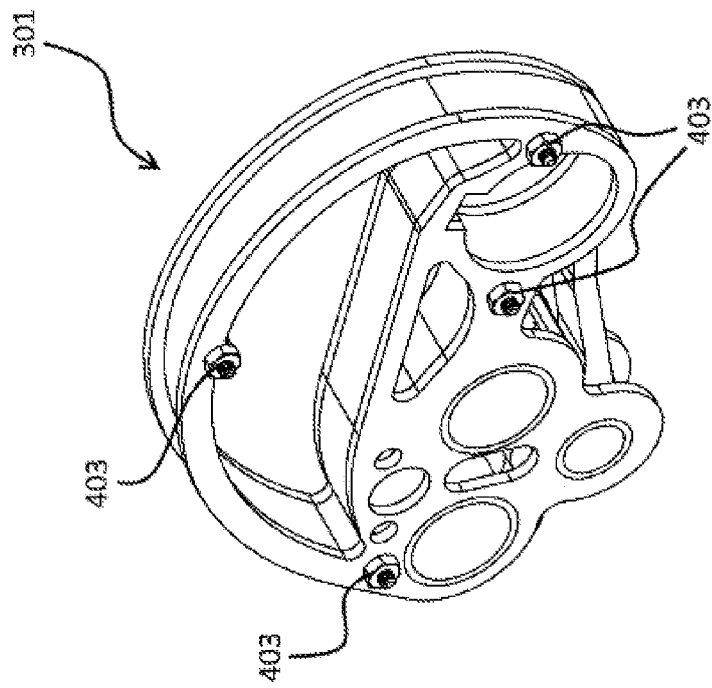
FIG. 4A is a side view of cams and springs for a body lightening system in both a retracted and extended position and FIG. 4B is a side view of a cam for the cam-spring system, in accordance with an illustrative embodiment of the present invention.
Figure 4A:
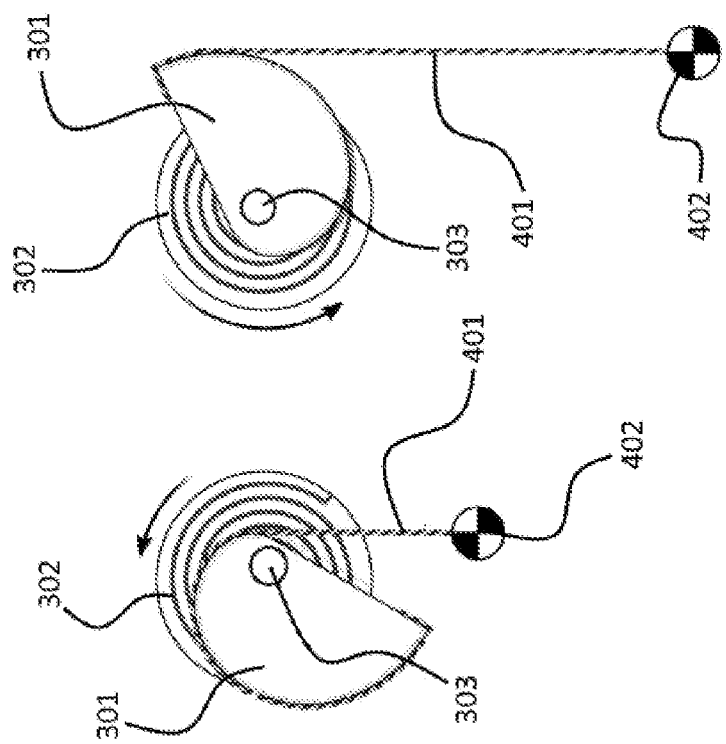

Referring now to FIGS. 4A and 4B in addition to FIG. 4, holding mechanism 300 creates the body lightening effect of the user in two ways. In one way, the apparent weight of the user is reduced by the tension induced in a holding cable 401 connected to the hanger 107. The tension in the holding cable 401 results from bending stresses in the springs 302 during vertical movement of the center of gravity of the user, represented in FIG. 4A by circle 402. Since the coiled springs 302 do not provide a constant force but rather provide a linear force, cam 301 is added to the shaft 303 connecting the springs 302. The cam 301 thus allows the application of a constant tension in the holding cable 401. Therefore, the rotational motion of the holding mechanism 300 is converted into translational motion to adjust to the user's center of gravity 402 movement. Further, cam 301 may be pierced to allow for the installation of at least one screw 403 to prevent the cam 301 from rotating beyond a certain limit, thus preventing the user from falling in case of failure of the springs 302.

Figure 5:
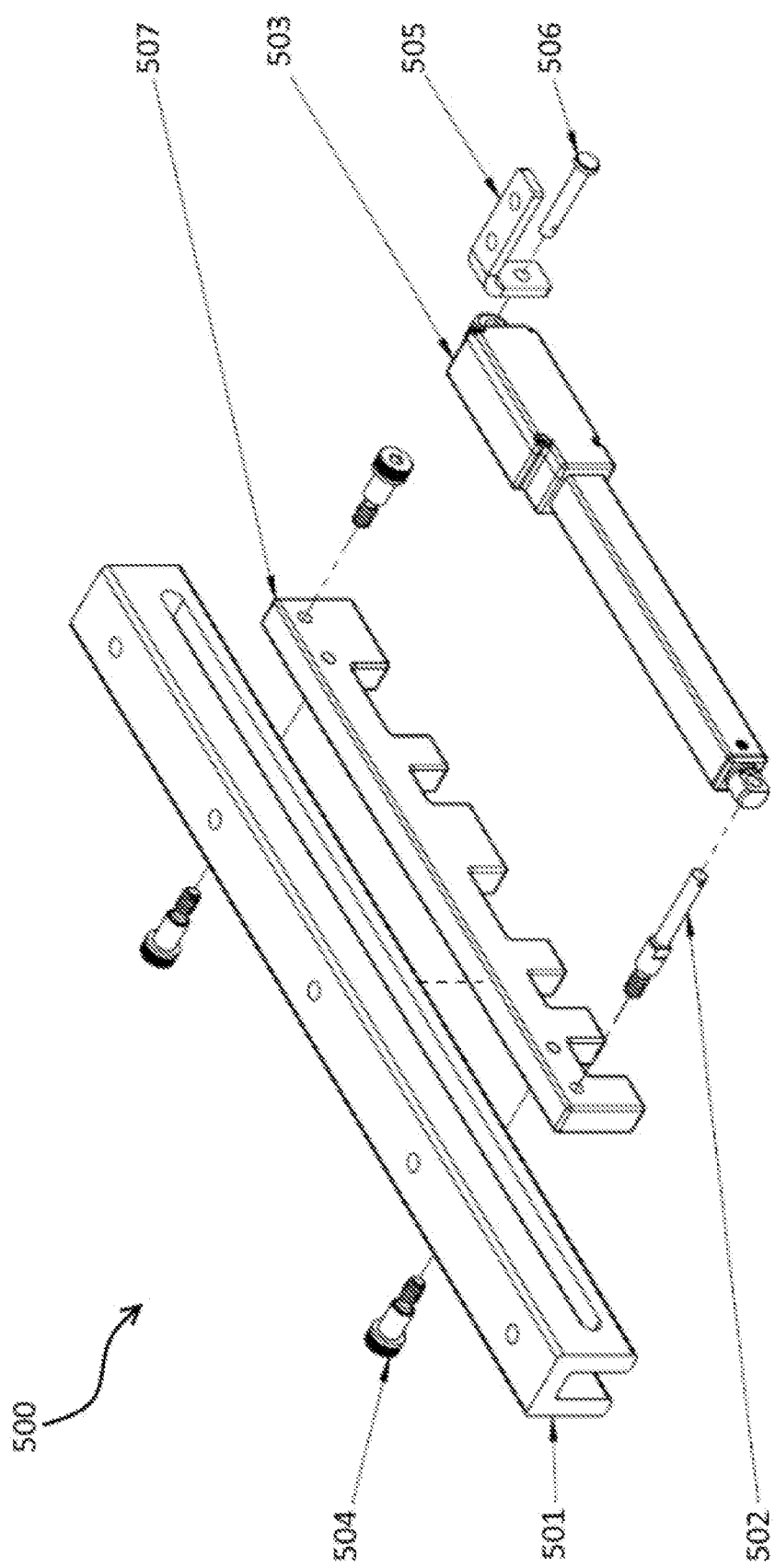
FIG. 5 is an exploded perspective view of an activation subsystem for a body lightening system, in accordance with an illustrative embodiment of the present invention.

Referring now to FIG. 5, there is shown an exploded view of an activation system 500 which allows for a plurality of spring combinations to be selected to allow for a variety of lightening combinations. Activation system 500 comprises a fork guide block 501, a rod 502, an actuator 503, a plurality of shoulder screws 504, an anchor 505, a pin 506 and a fork 507. Activation system 500 may selectively engage and disengage the springs 302 through the use of actuator 503. The fork 507 is attached to the fork guide block 501 via shoulder screws 504 and rods 502. The actuator 503 moves the fork 507 laterally to enable the different combinations of activated springs 302 with the anchor 505 and pin 506 combination. Actuator 503 is linked to a microcontroller (not shown) integrating an algorithm to determine the configuration of the springs 302 as a function of the desired percentage of weight felt by the user.

Figure 6B:
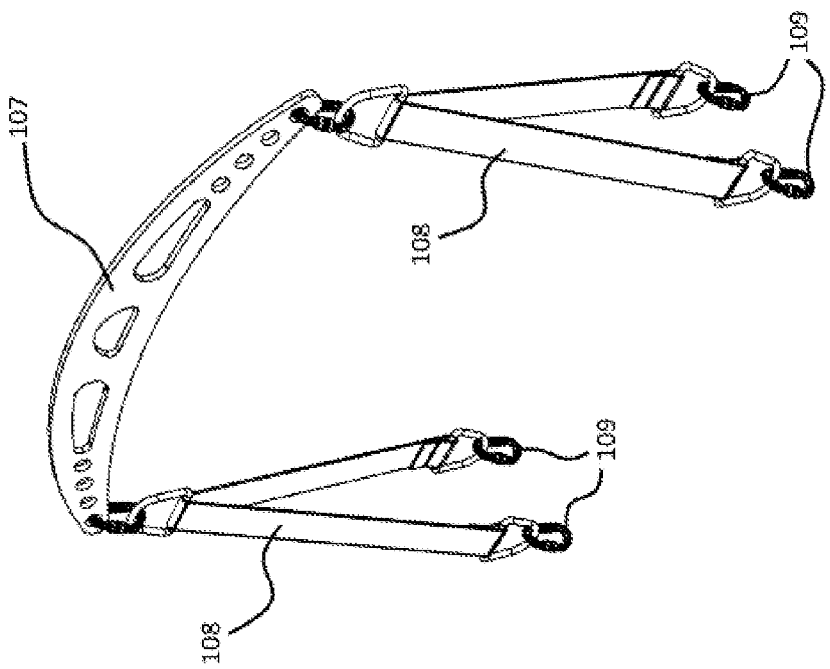
FIG. 6A is a front view of a hanger and FIG. 6B is a perspective view of the hanger and cables for a body lightening system, in accordance with an illustrative embodiment of the present invention.
Figure 6A:
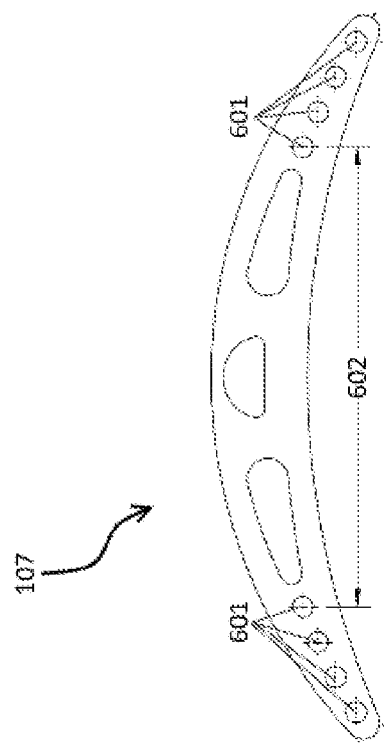

Referring now to FIGS. 6A and 6B, the hanger 107 comprises a plurality of holes 601 that are pierced on each side of the hanger 107 to enable adjustment of the distance 602 between the hanging cables 108 in relation to the width of the user. As shown in FIG. 6B, the hanging cables 108 attach at the four contact points 108 to the harness attached to the user, illustratively via a plurality of carabiners.

Figure 7A:
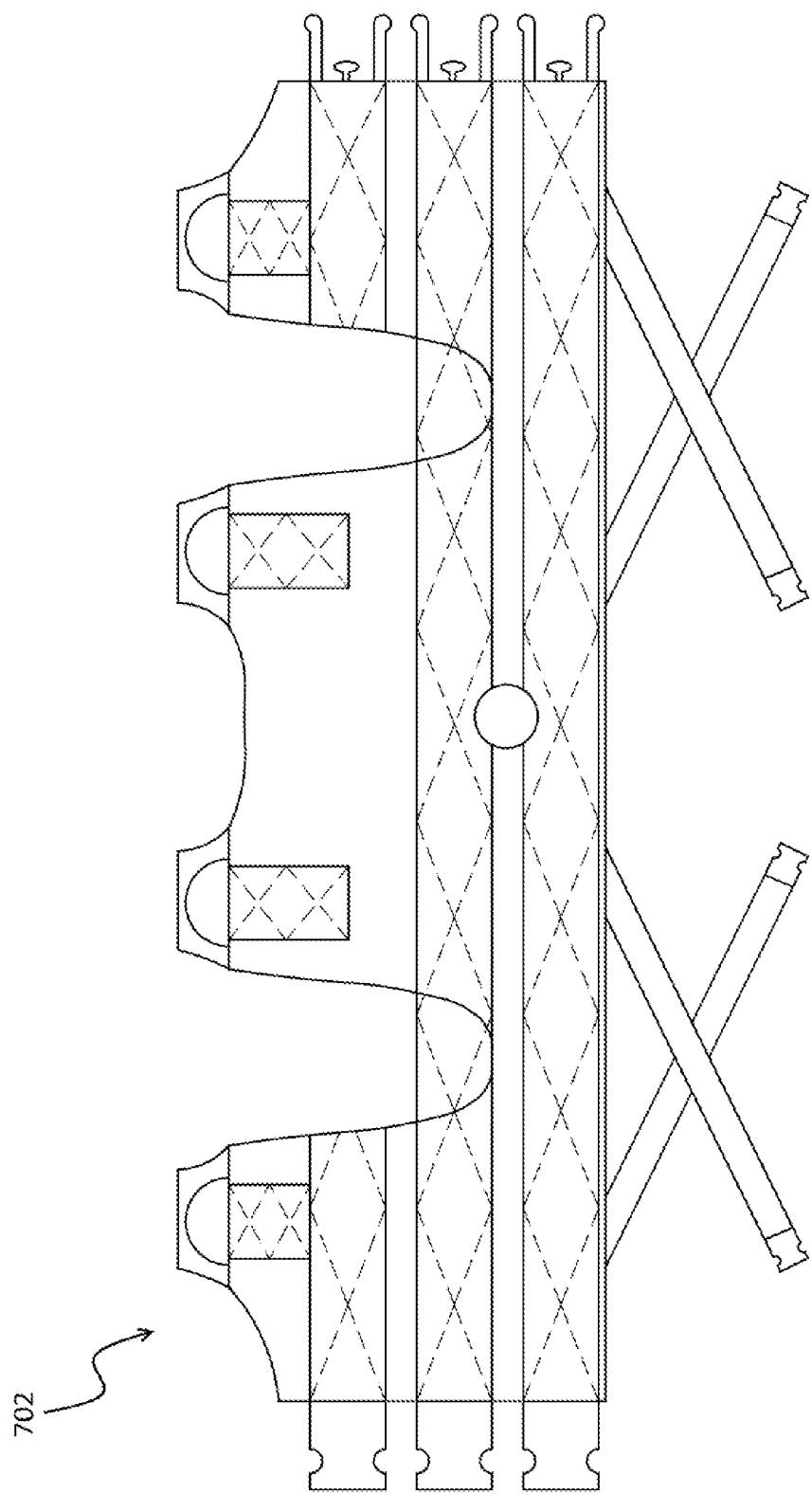
Figure 7B:
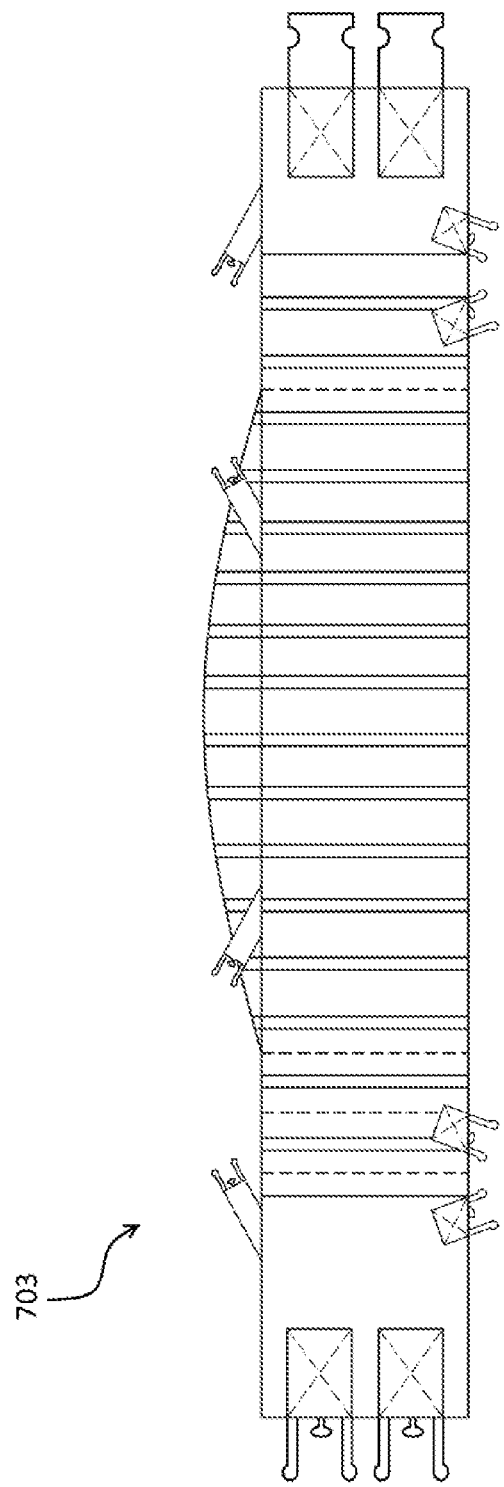
Figure 7D:
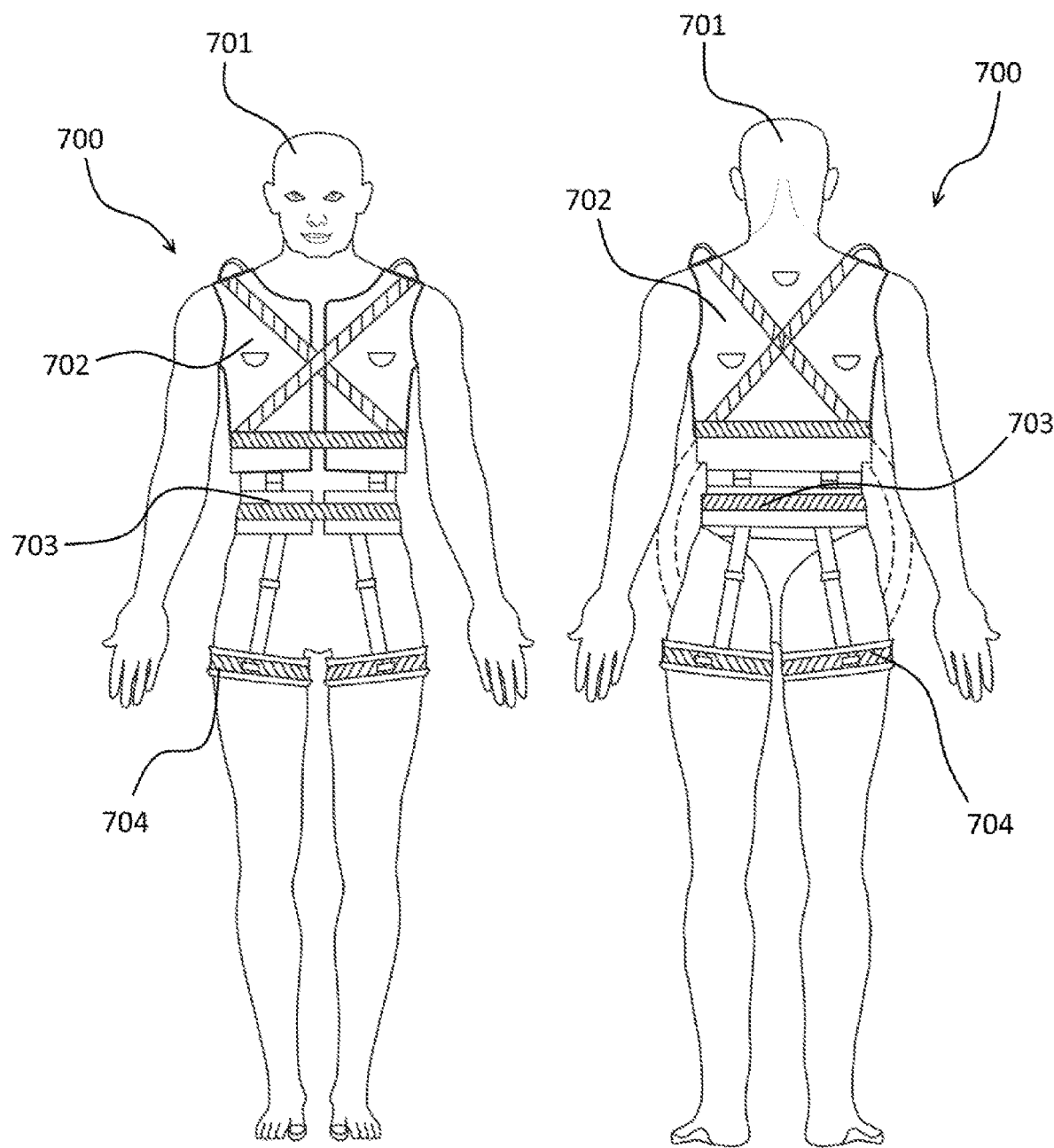

Referring now to FIGS. 7A to 7D, harness 700 comprises three main components to be attached to the user 701: an upper harness 702 that attaches to the upper body of the user 701, a harness belt 703 that is used to strap the harness 700 to the user's 701 midsection, and a lower harness 704 that attaches to the lower body of the user 701. FIG. 7D shown an example of a way to install the harness 700 on a user 701. In an embodiment, the harness belt 703 and the lower harness 704 are removable.

Figure 8B:
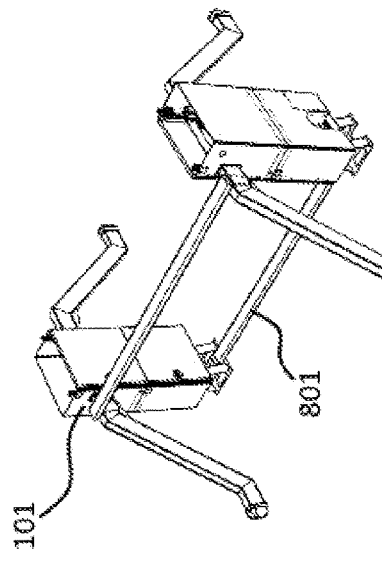
FIGS. 8A to 8D are perspective views of the various stages of assembly of a holding system for a body lightening system, in accordance with an illustrative embodiment of the present invention.
Figure 8D:
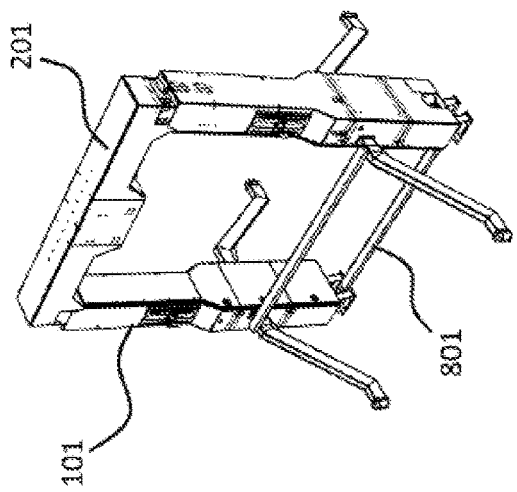
Figure 8A:
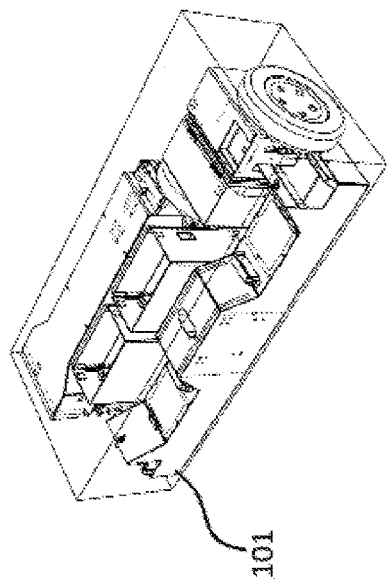
Figure 8C:
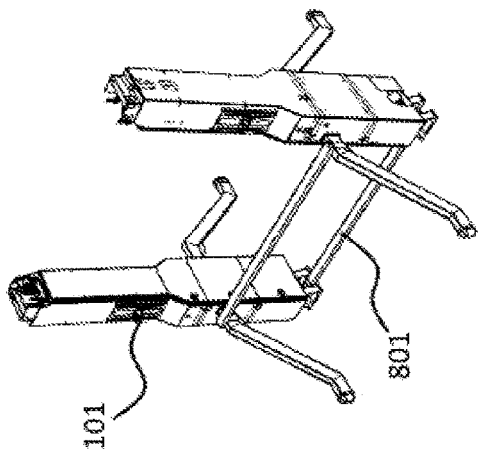

Referring now to FIGS. 8A to 8D, structure 101 may be easily disassembled for storage and transportation purposes and then reassembled so that it may be used. FIG. 8A shows the disassembled structure 101 for transportation or storage. The design of structure 101 makes it possible to keep the lower part sections straight prior to the installation of the legs that stabilize the structure 101. FIG. 8B shows the first assembly step and the transverse stem 801 that positions the structure 101 to the exact width to facilitate the insertion of the upper horizontal beam 201. FIG. 8C shows the second assembly step, where the pillars are fixed to the legs, allowing them to remain in place when the top horizontal beam 201 is not yet installed. FIG. 8D shows the third assembly step, when the top horizontal beam 201 has been installed. In an embodiment, structure 101 may be housed in a motor vehicle such as a truck or passenger car when disassembled.

Referring now to FIG. 9, an alternate embodiment of a body lightening system 900 is shown. In this embodiment, the holding mechanism 901 is located in a box 902 positioned in front of the user. A lifting system 903 is also positioned in front of the user and enables the upper part of the mast 904 to move from a horizontal position towards a vertical position to displace the hanger 905 that supports the user. Once again, the width of the system 900 is wide enough to allow for entry of a wheelchair 906.

As can be understood by a person skilled in the art, several configurations can be contemplated operating substantially in accordance with the above-exposed examples. Furthermore, the structure 101 can be made of various material, such as wood, plastic and metal.

In another example, the system 100 of FIG. 1 may also include sensors (not shown) to detect the angle of the hanger 107 in relation to the structure of the system 100 or otherwise the direction whereas the person using the system 100 is pulling the harness 700. Such sensors could be connected to the human machine interface 112 or to a separate control module (such as a microcontroller), so that the motorized wheels 104 are driven to follow the movements of the person using the apparatus, for example moving forward when the person leans forward and turning when the person's torso turns.

In yet another example, the harness 700 may further comprise at least one sensor (not shown) to measure biological data of the person using the system 100, for example to measure the movement of specific muscles or the nervous impulses of the person using the system 100. Such sensors may be used to monitor the health of the user and its progress in acquiring a normal gait. Biological data may also be used for research purposes, for example by doctors monitoring patients with various conditions, to study and understand better such conditions as well as to develop more efficient gait training programs for such patients.

The scope of the claims should not be limited by the preferred embodiments set forth in the examples, but should be given the broadest interpretation consistent with the description as a whole.

The invention claimed is:

1. A body lightening system (100) for at least partially supporting a weight of a user (701), the system (100) comprising:
   a structure (101), said structure (101) comprising a frame (102) and a motion system (103), said motion system (103) driving said structure (101) to follow movements of the user (701);
   a holding system (106), said holding system (106) comprising a holding mechanism (300), a hanger (107) and a plurality of hanging cables (108), said plurality of hanging cables (108) connecting said hanger (107) to a harness (700) to be worn by the user (701);
   a power system comprising a power source for powering the body lightening system (100); and
   a human machine interface (112), said human machine interface (112) providing control over a motion of said motion system (103) and a percentage of the user's (701) weight supported by said holding system (106);
   wherein said holding mechanism (300) comprises at least one cam (301) and a plurality of springs (302) connected by a shaft (303), said holding mechanism (300) further comprising at least one holding cable (401) connected to said at least one cam (301) and said hanger (107) for supporting the weight of the user (701), said system comprising an activation system (500) for selectively adjusting a number of said plurality of springs (302) exerting tension through said holding mechanism (300) based on the desired supported weight of the user (701).

2. The system (100) of claim 1, wherein said human machine interface (112) is controllable by at least one of a touch screen and a remote control.

3. The system (100) of claim 1, wherein said structure (101) is disassembleable and storable.

4. The system (100) of claim 1, wherein a height of said frame (102) is adjustable via a plurality of linear sliders (110).

5. The system (100) of claim 4, wherein the adjustability of the height of said frame (102) allows said holding system (106) to lift the user (701) from a seated position to a standing position.

6. The system (100) of claim 1, further comprising at least one screw (403) passing through said at least one cam (301), said at least one screw (403) preventing said at least one cam (301) from rotating beyond a predetermined limit.

7. The system (100) of claim 1, wherein said harness (700) comprises an upper harness (702) attachable to an upper body of the user (701), a harness belt (703) attachable to a midsection of the user (701) and a lower harness (704) attachable to a lower body of the user (701).

8. The system (100) of claim 7, wherein said harness belt (703) and said lower harness (704) are removable.

9. The system (100) of claim 1, wherein said power source comprises at least one battery.

\* \* \* \* \*